United States Patent
Gipp et al.

(10) Patent No.: US 9,424,269 B1
(45) Date of Patent: Aug. 23, 2016

(54) SYSTEMS AND METHODS FOR DEDUPLICATING ARCHIVE OBJECTS

(71) Applicant: Symantec Corporation, Mountain View, CA (US)

(72) Inventors: Stephan Gipp, St Louis Park, MN (US); Jeremy Wartnick, Minnetonka, MN (US)

(73) Assignee: Veritas Technologies LLC, Mountain View, CA (US)

( * ) Notice: Subject to any disclaimer, the term of this patent is extended or adjusted under 35 U.S.C. 154(b) by 209 days.

(21) Appl. No.: 14/134,502

(22) Filed: Dec. 19, 2013

(51) Int. Cl.
*G06F 17/30* (2006.01)

(52) U.S. Cl.
CPC ... *G06F 17/30156* (2013.01); *G06F 17/30073* (2013.01)

(58) Field of Classification Search
CPC ............... G06F 17/30067; G06F 17/30138; G06F 11/1451; G06F 11/0778; G06F 17/30395; G06F 12/0253; G06F 17/30073; G06F 17/30156; G06F 17/30159; G06F 17/30162; G05B 23/02; H03M 7/30; G06Q 10/10
USPC ....... 707/634, 640, 661, 662, 664, 665, 668, 707/669, 670, 692, 693, 923, 928, 938, 942
See application file for complete search history.

(56) References Cited

U.S. PATENT DOCUMENTS

| | | | | |
|---|---|---|---|---|
| 8,990,171 B2* | 3/2015 | Kalach | ............ | G06F 17/30159 707/664 |
| 2002/0059317 A1* | 5/2002 | Black | ............... | G06F 17/30067 |
| 2011/0093471 A1* | 4/2011 | Brockway | ......... | G06F 17/30616 707/747 |
| 2011/0246416 A1* | 10/2011 | Prahlad | ............ | G06F 17/30194 707/610 |
| 2014/0229451 A1* | 8/2014 | Venkatesh | ........ | G06F 17/30156 707/692 |

OTHER PUBLICATIONS

"Electronic discovery", http://en.wikipedia.org/wiki/E-discovery, as accessed Nov. 7, 2013, Wikipedia, (Sep. 13, 2006).

* cited by examiner

*Primary Examiner* — Greta Robinson
(74) *Attorney, Agent, or Firm* — ALG Intellectual Property, LLC (57) ABSTRACT

A computer-implemented method for deduplicating archive objects may include (1) tagging, using an archiving service, archive objects to indicate data related to the archive objects, (2) assigning an archive object and an additional archive object to be processed by a deduplication engine, (3) determining a degree of overlap between the archive object and the additional archive object based on tags assigned to the archive object and the additional archive object by the archiving service, and (4) adjusting, using the deduplication engine, deduplication between the archive object and the additional archive object using the degree of overlap determined to exist between the archive object and the additional archive object based on the tags assigned by the archiving service. Various other methods, systems, and computer-readable media are also disclosed.

20 Claims, 8 Drawing Sheets

SYSTEMS AND METHODS FOR DEDUPLICATING ARCHIVE OBJECTS

BACKGROUND

Individuals and organizations often process, index, and/or annotate records for archiving. For example, organizations may become involved in requirements for e-discovery of various records and documents. To prepare for e-discovery, these organizations may process their records and documents using an e-discovery service. The e-discovery service may tag strings of text and other data within the records for easy search, recall, and/or other statistics and processing.

Organizations also often deduplicate archived records (e.g., compress them by removing redundancies) to conserve storage space, for example. However, deduplication operations may suffer from several inefficiencies. For example, conventional deduplication systems may attempt to deduplicate records that contain little or no redundant information. Conventional systems may also lack information about which records share redundant information (and obtaining that information may be costly in terms of time and performance). Such systems may also attempt to deduplicate records that have few commonalities before deduplicating records that have more commonalities, despite time limits that prevent the system from deduplicating all records (e.g., misallocated priorities). Moreover, conventional deduplications systems may move records to different deduplication locations without grouping the records to optimize the commonalities between the records at one or more of these locations. The instant disclosure identifies a need, therefore, for improved methods for deduplicating archive objects.

SUMMARY

As will be described in greater detail below, the instant disclosure generally relates to systems and methods for deduplicating archive objects using tags or references assigned by an archiving or e-discovery system. As explained below, these tags or references may enable the disclosed systems and methods to more efficiently prioritize and relocate archive objects for deduplication.

In one example, a computer-implemented method for deduplicating archive objects may include (1) tagging, using an archiving service, archive objects to indicate data related to the archive objects, (2) assigning an archive object and an additional archive object to be processed by a deduplication engine, (3) determining a degree of overlap between the archive object and the additional archive object based on tags assigned to the archive object and the additional archive object using the archiving service, and (4) adjusting, using the deduplication engine, deduplication between the archive object and the additional archive object using the degree of overlap determined to exist between the archive object and the additional archive object based on the tags assigned by the archiving service.

In one example, the archiving service may include an e-discovery service that processes archive objects for legal investigations. In another example, adjusting deduplication may include adjusting a deduplication post-processing stage that follows a deduplication in-line processing stage. In some embodiments, adjusting the deduplication post-processing stage may include excluding backup images that share a predetermined threshold amount of deduplication references from the post-processing stage. Moreover, the excluded backup images may belong to a set of images that include archive objects containing an additional predetermined threshold amount of tags.

In some embodiments, determining the degree of overlap may include determining the degree of overlap based on tags indicating content within the archive object and the additional archive object. In further examples, determining the degree of overlap may include determining the degree of overlap based on tags indicating text content within the archive object and the additional archive object. In some examples, determining the degree of overlap may include determining the degree of overlap based on tags indicating metadata for the archive object and the additional archive object.

In some examples, adjusting deduplication may include comparing the degree of overlap determined to exist between the archive object and the additional archive object with an additional degree of overlap determined to exist between members of a different set of archive objects. The method may also include determining that the degree of overlap is greater than the additional degree of overlap. Moreover, adjusting deduplication may include prioritizing deduplication of the archive object and the additional archive object over deduplication of members of the different set of archive objects based on the determination that the degree of overlap is greater than the additional degree of overlap. Adjusting deduplication may also include prioritizing transmission of the archive object or the additional archive object based on the determination that the degree of overlap is greater than the additional degree of overlap. Additionally, adjusting deduplication may include grouping archive objects at different locations to increase predicted deduplication at one of the different locations.

In one embodiment, a system for implementing the above-described method may include (1) a tagging module, stored in memory, that tags, using an archiving service, archive objects to indicate data related to the archive objects, (2) an assignment module, stored in memory, that assigns an archive object and an additional archive object to be processed by a deduplication engine, (3) a determination module, stored in memory, that determines a degree of overlap between the archive object and the additional archive object based on tags assigned to the archive object and the additional archive object using the archiving service, (4) an adjustment module, stored in memory, that adjusts, using the deduplication engine, deduplication between the archive object and the additional archive object using the degree of overlap determined to exist between the archive object and the additional archive object based on the tags assigned by the archiving service, and (5) at least one physical processor that executes the tagging module, the assignment module, the determination module, and the adjustment module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) tag, using an archiving service, archive objects to indicate data related to the archive objects, (2) assign an archive object and an additional archive object to be processed by a deduplication engine, (3) determine a degree of overlap between the archive object and the additional archive object based on tags assigned to the archive object and the additional archive object by the archiving service, and (4) adjust, using the deduplication engine, deduplication between the archive object and the additional archive object using the degree of overlap determined to exist between the archive object and the additional archive object based on the tags assigned by the archiving service.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for deduplicating archive objects. As will be explained in greater detail below, the disclosed systems and methods may increase the speed and efficiency of deduplication operations. For example, these systems and methods may more accurately predict a degree to which a deduplication engine may deduplicate two archive objects. The systems and methods may also more efficiently allocate different sets of archive objects to different deduplication engines to optimize deduplication.

Figure 1:
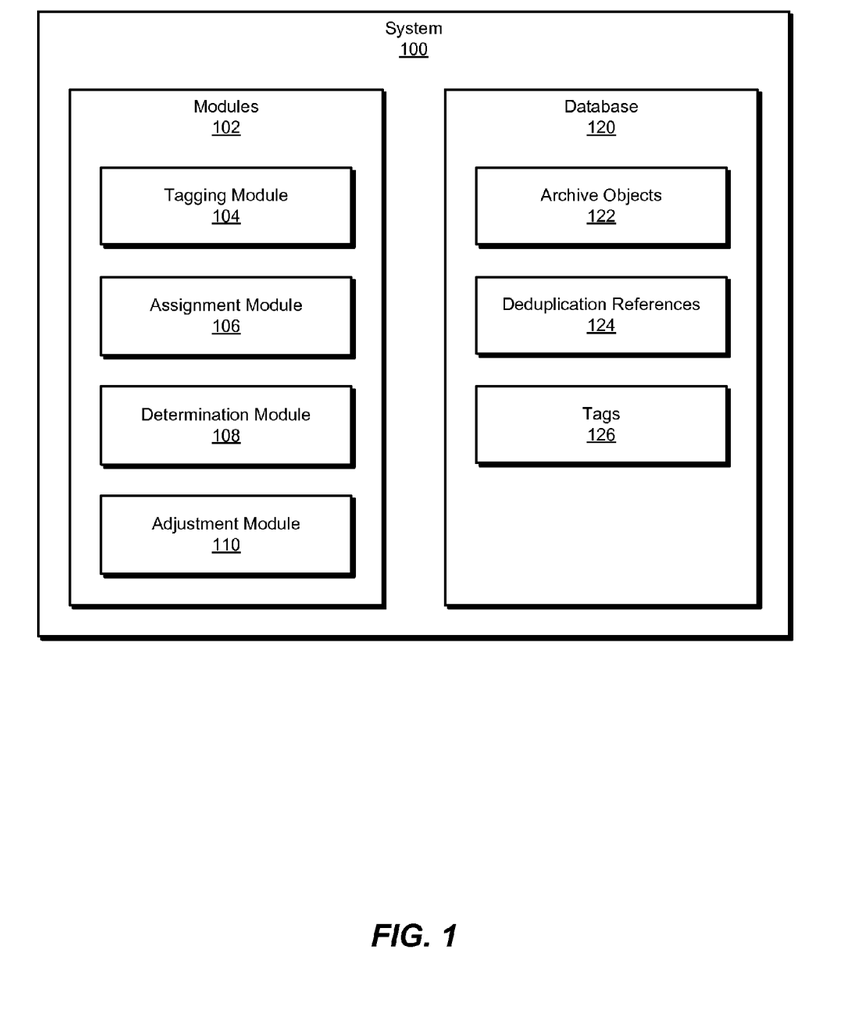
FIG. 1 is a block diagram of an exemplary system for deduplicating archive objects.
Figure 2:
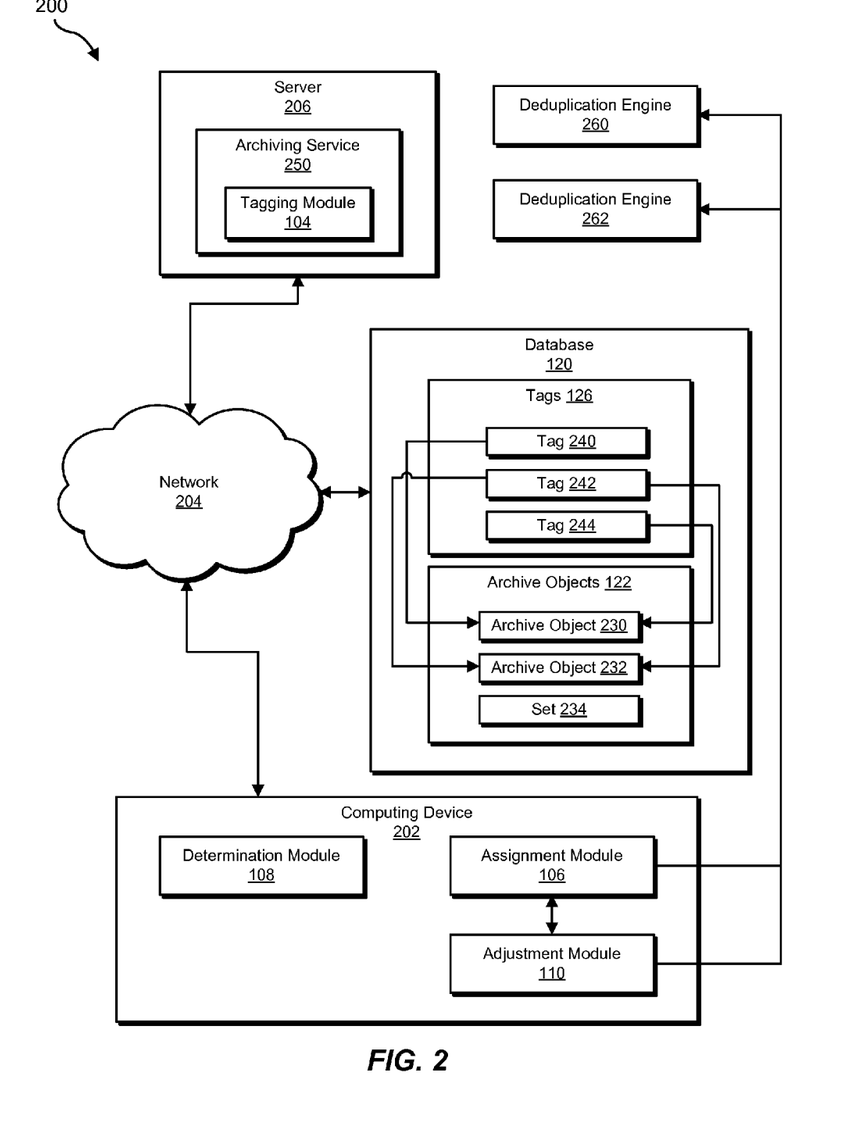
FIG. 2 is a block diagram of an additional exemplary system for deduplicating archive objects.

The following will provide, with reference to FIGS. 1-2, detailed descriptions of exemplary systems for deduplicating archive objects. Detailed descriptions of corresponding computer-implemented methods will also be provided in connection with FIG. 3. Moreover, detailed descriptions of exemplary archive objects will be provided in connection with FIGS. 4-5. Furthermore, detailed descriptions of exemplary deduplication engines will be provided in connection with FIG. 6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for deduplicating archive objects. As illustrated in this figure, exemplary system 100 may include one or more modules 102 for performing one or more tasks. For example, and as will be explained in greater detail below, exemplary system 100 may include a tagging module 104 that tags, using an archiving service, archive objects to indicate data related to the archive objects. Exemplary system 100 may also include an assignment module 106 that assigns an archive object and an additional archive object to be processed by a deduplication engine.

In addition, and as will be described in greater detail below, exemplary system 100 may include a determination module 108 that determines a degree of overlap between the archive object and the additional archive object based on tags assigned to the archive object and the additional archive object by the archiving service. Furthermore, exemplary system 100 may include an adjustment module 110 that adjusts, using the deduplication engine, deduplication between the archive object and the additional archive object using the degree of overlap determined to exist between the archive object and the additional archive object based on the tags assigned by the archiving service. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store archive objects 122. As used herein, the phrase "archive objects" generally refers to electronic objects, such as files, emails, and documents (including scanned documents) within the context of a storage archive. Similarly, database 120 may be configured to store deduplication references 124. As used herein, the phrase "deduplication references" generally refers to metadata identifying and/or containing common underlying data used to deduplicate archive objects, as discussed below. Moreover, database 120 may be further configured to store tags 126. As used herein, the phrase "tags" generally refers to marks or metadata assigned to underlying data or documents to indicate information about the underlying data or documents. An e-discovery service may assign the tags, as discussed below. The systems and methods described herein may leverage assigned tags to predict how well (e.g., how fast, efficiently, and/or to what estimated degree of compression) a deduplication system may deduplicate archive objects.

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In the example of FIG. 2, server 206 may internally or remotely manage, execute, and/or direct archiving processing, including e-discovery services. Accordingly, server 206 may include an archiving service 250, which may further include tagging module 104. In contrast, computing device 202 may manage, execute, and/or direct deduplication processing by itself or in cooperation with one or more deduplication engines, including potentially deduplication engine 260 and deduplication engine 262 (although not shown in FIG. 2, these engines may also have connections to network 204 apart from computing device 202). Accordingly, computing device 202 may include assignment module 106, which may assign archive objects for deduplication. Similarly, computing device 202 may also include determination module 108 and adjustment module 110. Computing device 202 may cooperate with server 206 by leveraging and analyzing tags assigned at server 206 to predict estimated deduplication results and/or more efficiently allocate and/or setup deduplication processing.

Although shown as separate, one or more of computing device 202, server 206, and modules 102 may be combined into one or more other combinations or permutations. Furthermore, system 200 may further include database 120 (including a further set 234 of pointers or identifiers of archive objects), which may be stored in a single storage (as in FIG. 2) or across multiple devices, such as computing device 202 and server 206. Computing device 202 and/or server 206 may access database 120 through network 204.

In one embodiment, one or more of modules 102 from FIG. 1 may, when executed by at least one processor of computing device 202 and/or server 206, enable computing device 202 and/or server 206 to deduplicate archive objects. For example, and as will be described in greater detail below, one or more of modules 102 may cause computing device 202 and/or server 206 to tag, using archiving service 250, archive objects to indicate data related to the archive objects. Moreover, one or more of modules 102 also may cause computing device 202 and/or server 206 to assign an archive object 230 and an additional archive object 232 to be processed by a deduplication engine, such as deduplication engine 260 or deduplication engine 262. In some examples, one or more of modules 102 may subsequently cause computing device 202 and/or server 206 to determine a degree of overlap between archive object 230 and additional archive object 232 based on tags, such as tag 240, tag 242, and tag 244, assigned to archive object 230 and additional archive object 232 by archiving service 250. Furthermore, one or more of modules 102 may additionally cause computing device 202 and/or server 206 to adjust, using the deduplication engine, deduplication between archive object 230 and additional archive object 232 using the degree of overlap determined to exist between archive object 230 and additional archive object 232 based on the tags assigned by archiving service 250.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 710 in FIG. 7, or any other suitable computing device.

Server 206 generally represents any type or form of computing device that is capable of tagging and/or deduplicating archive objects. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
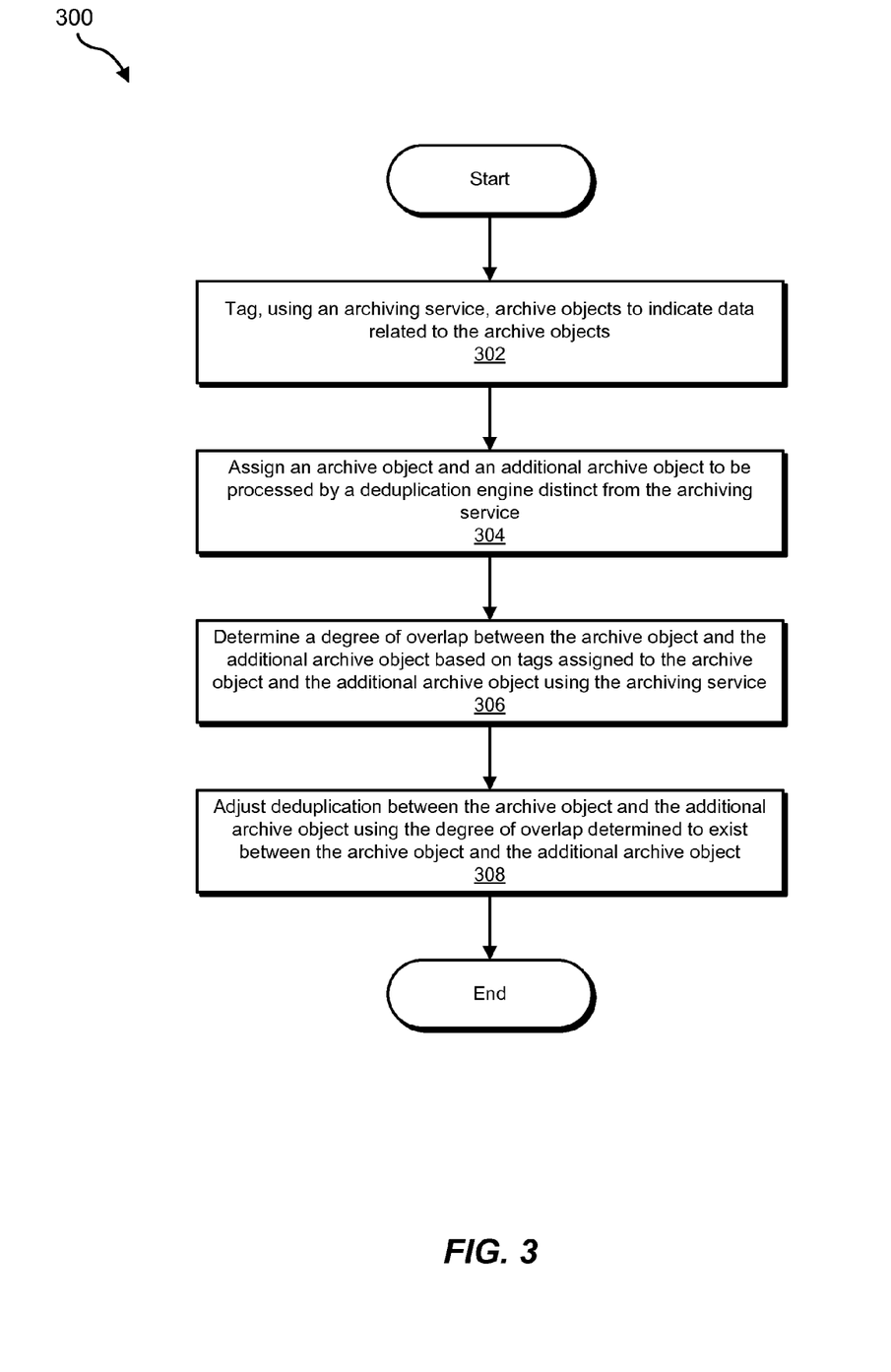
FIG. 3 is a flow diagram of an exemplary method for deduplicating archive objects.

FIG. 3 is a flow diagram of an exemplary computer-implemented method 300 for deduplicating archive objects. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may tag, using an archiving service, archive objects to indicate data related to the archive objects. For example, tagging module 104 may, as part of server 206 in FIG. 2, tag, using archiving service 250, archive objects to indicate data related to the archive objects. As used herein, the term "archiving service" generally refers to any service or functionality for storing files, data, records, and/or documents for potential subsequent retrieval and/or processing.

Tagging module 104 may tag, using archiving service 250, archive objects to indicate data related to the archive objects in a variety of ways. For example, tagging module 104 may tag some (e.g., specified) and/or all documents that are incoming to a specified locations, such as an inbox, file folder, disk drive, virtual drive, physical machine, and/or hardware machine. Moreover, tagging module 104 may tag archive objects by searching those archive objects for specified data, content, metadata, and/or patterns of the same.

In some examples, a user or administrator may specify the data and/or patterns for searching. For example, the user and/or archiving service may specify that particular data and/or patterns indicate relevant documents for e-discovery purposes (as discussed below), and/or are valuable documents for preservation. Upon detecting one or more hits, tagging module 104 may tag the archive objects to mark the found data or pattern. The tag may indicate the particular data or type of data identified as associated with or located within the document, as well as metadata about the found data, including the timing of discovery and/or the location where the data resides within the document.

Additionally, or alternatively, tagging module 104 may index some (e.g., specified) part(s) and/or all of the archive objects. For example, tagging module 104 may parse the archive objects into segments and/or permutations of text, characters, fields, and/or sections, which may have lengths or delimiters specified or formulated by tagging module 104 and/or a user. These segments may include words, phrases, numbers, sentences, and/or paragraphs, as well as metadata fields including header field or variable name and/or variable value. As used herein, the phrase "metadata" generally refers to data about underlying data and/or files, including data about file content, file/packet payload, and/or displayed content (e.g., metadata may indicate how other data should be displayed, formatted, and/or stored). Examples of such metadata include, without limitation, a file name, file type, last modified date and/or time, encryption/privacy status, file author/creator, edit history, and/or any other metadata stored within the file or otherwise associated with the file by a data structure.

In general, tagging module 104 may search and/or index documents upon reception, upon a defined schedule, upon user/administrator command, and/or upon detecting that the documents are candidates for e-discovery, for example. In addition, archiving service 250 may enable users and/or programs to search, process, display, and/or reference archive objects using queries in terms of assigned tags.

In some examples, tagging module 104 may use an archiving service that includes or constitutes an e-discovery service. In these examples, the e-discovery service may process archive objects for legal investigations. As used herein, the phrase "legal investigations" generally refers to civil and/or criminal litigation, arbitration, and/or government or quasi-government investigations and/or discovery requirements. Accordingly, the e-discovery service may include functionality for identifying relevant documents (e.g., relevant to a legal investigation), preserving relevant documents, collecting and transferring relevant documents to legal counsel, converting documents into formats more convenient for batch review and/or e-discovery, and/or extracting text and/or metadata.

As further shown in FIG. 3, at step 304 one or more of the systems described herein may assign an archive object and an additional archive object to be processed by a deduplication engine. For example, assignment module 106 may, as part of computing device 202 in FIG. 2, assign archive object 230 and additional archive object 232 to be processed by a deduplication engine distinct from (or included within) archiving service 250.

Notably, the systems and methods herein may facilitate or improve deduplication by analyzing previously-assigned tags (e.g., by another system, such as an e-discovery service) prior to the deduplication engine searching for, identifying, and/or marking its own deduplication references to begin or complete deduplication. In other words, the e-discovery tags and the deduplication references may be substantially or fundamentally different, such that the e-discovery tags enable prediction of how well the deduplication engine will perform deduplication, and the deduplication engine later creates and/or processes its own deduplication references to actually (as opposed to predictably) implement and/or complete deduplication.

Assignment module 106 may assign archive object 230 and additional archive object 232 to be processed by a deduplication engine in a variety of ways. For example, assignment module 106 may autonomously assign the archive objects for deduplication based on a deduplication policy and/or in response to user/administrator commands. This deduplication policy may specify that some (e.g., designated) or all documents satisfying established conditions should be assigned for deduplication, including conditions related to size, type, timing, location, relocation, arrival, and/or relevance.

In some examples, assignment module 106 may initially assign archive object 230 and additional archive object 232 for initial, in-line, lazy, and/or more efficient deduplication. As used herein, the phrase "in-line deduplication" generally refers to deduplication at a storage location as the data is first received, retrieved, and/or stored at the storage location (e.g., in real time). In general, in-line deduplication contrasts with post-processing deduplication, which may occur after an in-line stage of deduplication and which may involve greater amounts of time (e.g., slower than real time processing), storage, and/or computing power. Assignment module 106 may also assign archive object 230 and additional archive object 232 to be processed as candidates for a post-processing stage of deduplication. As used herein, the phrase "assign [ . . . ] to be processed by a deduplication engine" generally refers to direct or immediate deduplication, identifying candidates for deduplication, and/or identifying archive objects to be sorted, evaluated, prioritized, and/or relocated for deduplication. Notably, assignment module 106 may also, or additionally, assign archive object 230 and additional archive object 232 for deduplication prior to, and/or based on, results or output from determination module 108 and/or adjustment module 110, as discussed below.

As further shown in FIG. 3, at step 306 one or more of the systems described herein may determine a degree of overlap between the archive object and the additional archive object based on tags assigned to the archive object and the additional archive object using the archiving service. For example, determination module 108 may, as part of computing device 202, determine a degree of overlap between archive object 230 and additional archive object 232 based on tags assigned to archive object 230 and additional archive object 232 by archiving service 250.

Determination module 108 may determine a degree of overlap between archive object 230 and additional archive object 232 in a variety of ways. In some examples, determination module 108 may calculate a proportion and/or number of tags assigned to archive object 230 that are (1) also assigned to additional archive object 232, and/or (2) vice versa (throughout this description, archive object 230 and additional archive object 232 may be largely interchangeable). In these examples, determination module 108 may calculate a degree of estimated overlap using a function based on values (1) and/or (2), such as a weighted or non-weighted average, median, sum, and/or product.

Moreover, determination module 108 may weight different tags differently, based on the type, nature, and/or content of the tag. For example, determination module 108 may weigh tags of larger text or content more heavily than tags of smaller text or content, and/or weigh tags of underlying data more heavily than tags of metadata (which tends to be smaller than underlying data).

In further examples, determination module 108 may perform the calculation over some (e.g., designated) or all tags assigned to an archive object. For example, determination module 108 may limit its calculation of overlap to tags satisfying one or more conditions, including conditions related to tag type (e.g., text, metadata, images), tag keyword (e.g., e-discovery keyword), and/or tag creation or modification date. Similarly, determination module 108 may determine the degree of overlap based on tags indicating content, such as text, and/or metadata, within and/or associated with the archive object and the additional archive object.

Figure 4:
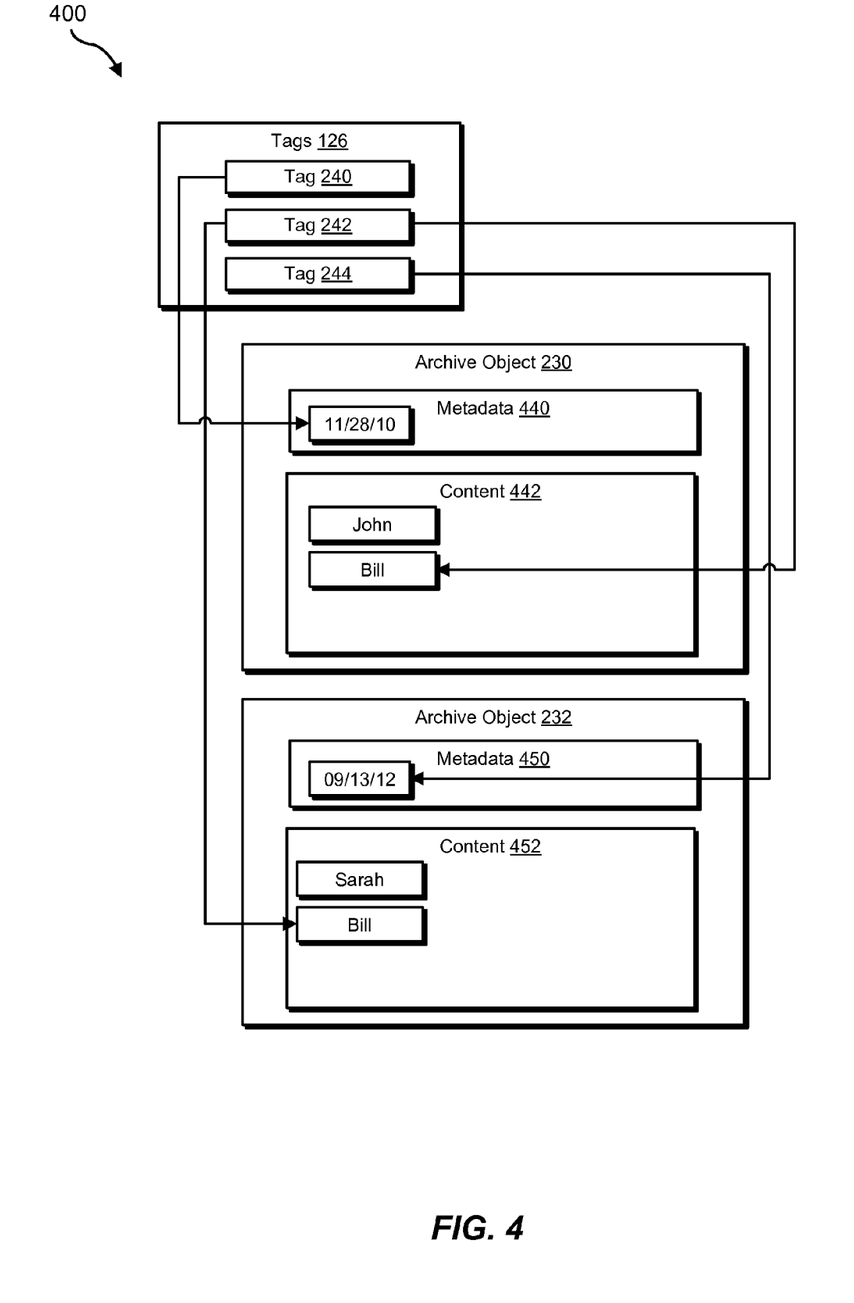
FIG. 4 is a block diagram of exemplary tags and archive objects.

FIG. 4 shows a block diagram illustrating how different tags may apply to different archive objects. In the example of FIG. 4, archive object 230 and additional archive object 232 may correspond to archived emails. Tagging module 104 may have assigned tag 240 to metadata 440 in archive object 230, which may indicate that archive object 230 was sent on "11/28/10." Similarly, tagging module 104 may have assigned tag 244 to additional metadata 450 in archive object 232, which may indicate that archive object 232 was sent on "09/13/12." Furthermore, tagging module 104 may have assigned tag 242 to both of the archive objects, because both of these archive objects contain the name "Bill" within their content (e.g., as a signature). Accordingly, determination module 108 may determine that archive object 230 has a 33% (⅓) degree of overlap with the additional archive object (and vice versa), because archive object 230 shares one third of its own tags and one third of the tags assigned additional archive object 232 (in some or most cases, the proportions may be different for two archive objects under comparison). Moreover, determination module 108 may determine a granular or absolute/binary degree of overlap, such as by initially calculating a granular degree of overlap, and then comparing that degree to a threshold level to reach a binary conclusion (i.e., overlap or no overlap) or category of overlap (e.g., low, medium, high). Although FIG. 4 is limited to three tags each for both archive objects, these particular tags are merely examples and far more tags, including tags of different types and/or lengths, may be used.

As further shown in FIG. 3, at step 308 one or more of the systems described herein may adjust, using the deduplication engine, deduplication between the archive object and the additional archive object using the degree of overlap determined to exist between the archive object and the additional archive object based on the tags assigned by the archiving service. For example, adjustment module 110 may, as part of computing device 202, adjust, using the deduplication engine, deduplication between archive object 230 and additional archive object 232 using the degree of overlap determined to exist between archive object 230 and additional archive object 232 based on the tags assigned by archiving service 250.

Adjustment module 110 may adjust deduplication in a variety of ways. In one example, adjustment module 110 may begin adjustment by limiting deduplication to (1) archive objects having at least a defined amount or proportion of tags (indicating higher potential deduplication) and/or (2) backup images (where archive objects may be stored) that contain less than a defined amount or proportion of deduplication references (otherwise indicating that these images may already been sufficiently deduplicated). For example, adjustment module 110 may adjust a deduplication post-processing stage that follows a deduplication in-line processing stage, such as by excluding archive objects and/or backup images from the post-processing stage based on factors (1) and/or (2) above. In other words, adjustment module 110 may adjust the deduplication post-processing stage at least in part by excluding backup images that share a predetermined threshold amount of deduplication references (e.g., references generated during the in-line stage) from the post-processing stage. Moreover, the excluded backup images may belong to a set of images that each include archive objects containing an additional predetermined threshold amount of tags assigned by archiving service 250. Notably, the predetermined threshold and the additional predetermined threshold may have the same, similar, or different values.

Tags assigned by tagging module 104 and deduplication references assigned or marked by a deduplication engine may be identical, substantially identical, different, and/or mapped to each other. In addition, the deduplication engine may create deduplication references based on previously-assigned tags, such as by copying tags (e.g., while formatting and/or modifying them) as deduplication references, while nevertheless creating its own deduplication references (e.g., the copies) to actualize deduplication. Notably, archiving service 250 may assign tags to archive objects even when the tags do not identify underlying content (e.g., potentially redundant and removable content), and so the phrase "tag" may be broader than "deduplication reference" in that respect.

In one illustrative example, tagging module 104 may tag a file as created on a particular date, even if the file contains no data indicating its creation date and therefore no data about the date that can be removed or compressed. In this example, the deduplication engine may be unable, for that reason, to copy the tag as a deduplication reference. Nevertheless, the deduplication engine may predict that other files created on the same date are more likely to have common content (e.g., increased deduplication potential) than files not created on the same date, and therefore not sharing that metadata tag.

In other examples, adjustment module 110 may adjust deduplication at least in part by comparing the degree of overlap determined to exist between the archive object and the additional archive object with an additional degree of overlap determined to exist between members of a different set of archive objects. The following discussion outlines how these examples may function with reference to FIG. 5. As shown in the figure, set 234 may include a different set of archive objects than the set including archive object 230 and additional archive object 232, as discussed above. Specifically, set 234 may also include archive object 230 (reproduced from FIG. 4), but lack additional archive object 232, and instead include a different archive object 532, which may further contain metadata 550 and content 552. Notably, although set 234 shares an archive object with the previously discussed set of archive object 230 and additional archive object 232, these two sets may instead share no members (and may contain an arbitrary number of archive objects).

Figure 5:
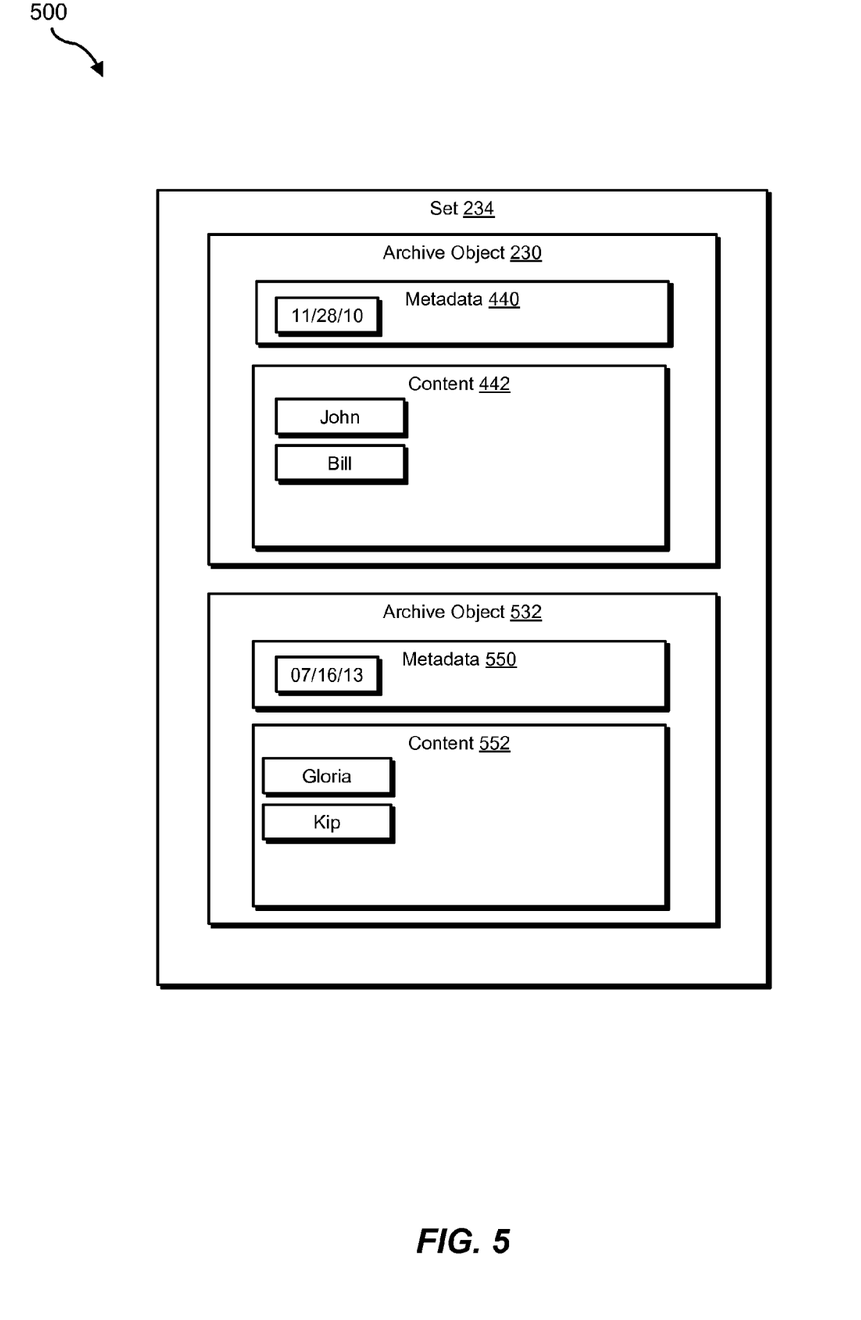
FIG. 5 is a block diagram of exemplary tags and archive objects within a set of archive objects.

As shown in FIG. 5, determination module 108 may determine that archive object 230 and different archive object 532 have no or substantially no overlap. In contrast to the archive objects shown in FIG. 4, those shown in FIG. 5 contain both different dates in their metadata, and completely different names in their underlying content. Accordingly, adjustment module 110 may determine that the degree of overlap between the archive objects shown in FIG. 4 is greater than the additional degree of overlap between the archive objects shown in FIG. 5.

Figure 6:
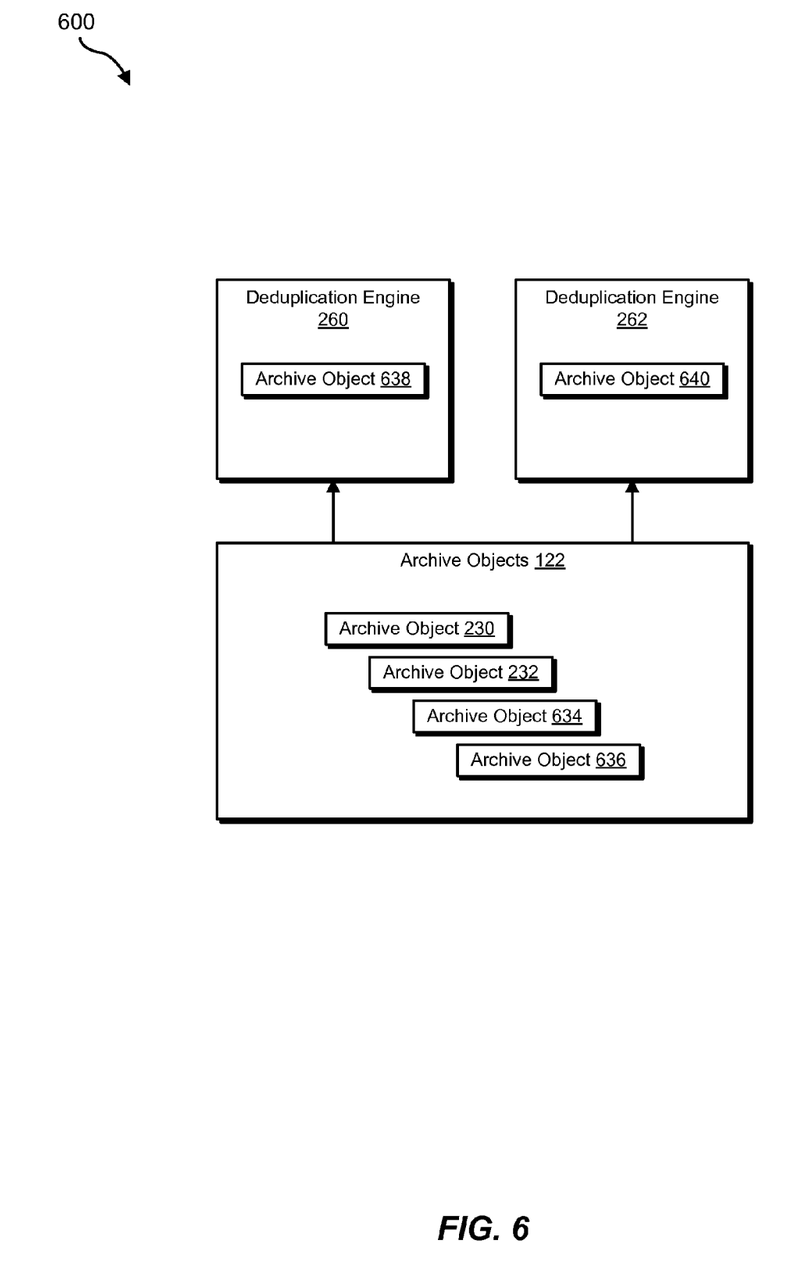
FIG. 6 is a block diagram of exemplary deduplication engines.

Adjustment module 110 may adjust deduplication in various ways based on the determination that the overlap for one set of archive objects is greater than for another set. FIG. 6 is a block diagram showing exemplary deduplication engines that may illustrate various adjustments that adjustment module 110 may make. As shown in FIG. 6, archive objects 122 may include archive object 230 and additional archive object 232 (as discussed above), as well as archive object 634, archive object 636, archive object 638, and archive object 640 (the last two of which may have been relocated to deduplication engine 260 and deduplication engine 262, respectively).

In one example, adjustment module 110 may adjust deduplication at least in part by prioritizing deduplication of the archive object and the additional archive object over deduplication of members of the different set of archive objects based on the determination that the degree of overlap is greater than the additional degree of overlap. More specifically, adjustment module 110 may order and/or reorder a queue to prioritize, in time, sets of archive objects that have higher overlap than other sets having lower overlap.

Similarly, adjustment module 110 may adjust deduplication at least in part by prioritizing transmission of the archive object and/or the additional archive object based on the determination that the degree of overlap is greater than the additional degree of overlap. For example, adjustment module 110 may have prioritized transmitting archive object 638 and/or archive object 640 ahead of the remaining archive objects. Similarly, based on the determination of greater overlap (as discussed above), adjustment module 110 may prioritize transmitting one or both of archive object 230 and/or 232. In particular, adjustment module 110 may prioritize sending archive objects that have greater overlap (e.g., with each other and/or with archive objects already at the destination, such as archive object 638 and/or archive object 640) over other sets of archive objects that have lower overlap.

More generally, and without necessarily prioritizing archive objects in time, adjustment module 110 may perform calculations to group or sort archive objects to different destinations (e.g., deduplication engines) to maximize and/or optimize deduplication between archive objects at one or more destination, as discussed further below. According to one algorithm, adjustment module 110 may identify constraints (if any) on locations, movement, and/or permutations of destinations and archive objects. For example, certain locations may have constraints on the number of archive objects (e.g., zero), archive object type, and/or computation, storage, and/or bandwidth. Similarly, archive objects may have constraints on movement (e.g., cannot move, or can move to certain destinations but not others). Given those constraints, adjustment module 110 may generate permutations of destinations and archive objects at those destinations. Adjustment module 110 may then calculate, according to one or more formulas or heuristics (as discussed above regarding determination module 108), such as a weighted or non-weighted sum or product, a degree of deduplication or overlap, over some (e.g., more than one) or all destinations and/or archive objects. In other words, adjustment module 110 may load balance (in an optimized or more efficient manner) deduplication across multiple deduplication engines based on estimated degrees of overlap between archive objects at one or more same deduplication engines, among other factors.

In the example of FIG. 6, adjustment module 110 may determine that any permutation of the six archive objects results in optimal or improved overlap or deduplication, such as moving all archive objects to one deduplication engine, dividing them evenly between the two deduplication engines, or any other permutation (within any existing constraints such as constraints on bandwidth, workload, software protocols, user preferences, etc.). Accordingly, adjustment module 110 may adjust deduplication at least in part by grouping archive objects at different locations to increase predicted deduplication at one of the different locations. Moreover, all comments about analyzing, comparing, prioritizing, transmitting, grouping, and/or sorting archive objects and sets of archive objects, as discussed above, may similarly apply to backup images, as a whole, that contain sets of archive objects (e.g., but cannot be conveniently divided). Similarly, although the above discussion has focused on comparing overlap between two archive objects, archive object 230 and additional archive object 232, the disclosed systems and methods may generally compare larger sets or backup images to determine degrees of overlap between those larger sets or backup images. Lastly, adjustment module 110 may, in some cases, adjust deduplication by excluding one or more archive objects or backup images from the post-processing stage of deduplication.

As explained above, the disclosed systems and methods may increase the speed and efficiency of deduplication operations. For example, these systems and methods may more accurately predict a degree to which a deduplication engine may deduplicate two archive objects. The systems and methods may also more efficiently allocate different sets of archive objects to different deduplication engines to optimize deduplication.

Figure 7:
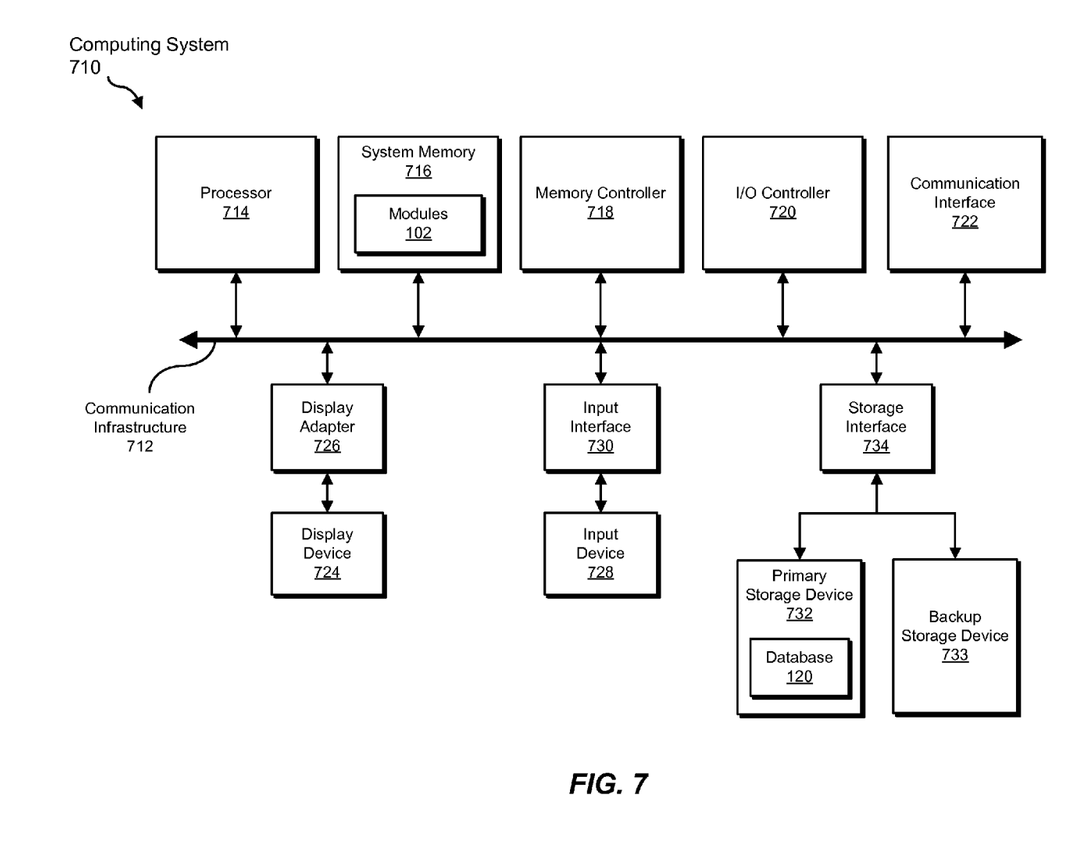
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitorytype media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
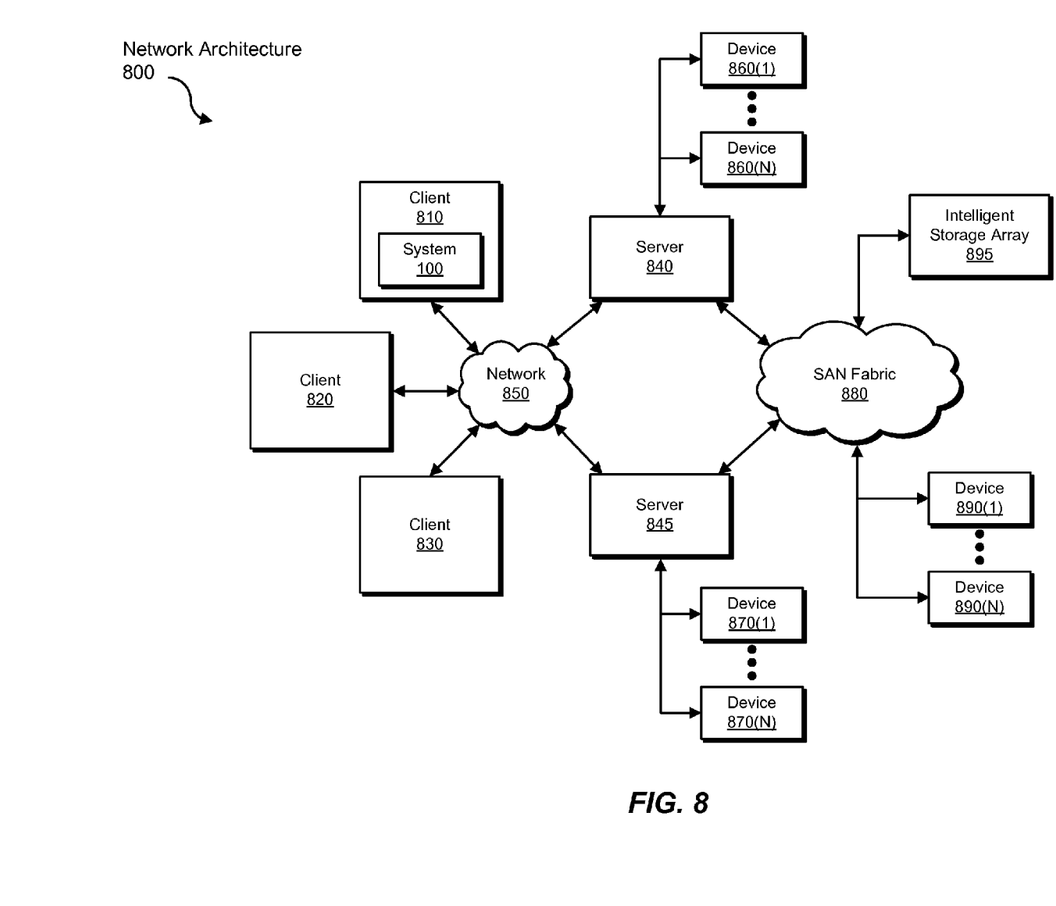
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for deduplicating archive objects.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive archive data to be transformed, transform the data by deduplicating, reordering, and/or re-prioritizing the data, output a result of the transformation to memory or an output device such as a display, use the result of the transformation to conserve storage space, and store the result of the transformation to disk or memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for deduplicating archive objects, at least a portion of the method being performed by a computing device comprising at least one processor, the method comprising:
   tagging, using an e-discovery service, archive objects to indicate data related to the archive objects;
   assigning an archive object and an additional archive object to be processed by a deduplication engine;
   determining a degree of overlap between the archive object and the additional archive object by determining a number of e-discovery tags that the archive object and the additional archive object share in common;
   adjusting, using the deduplication engine, deduplication between the archive object and the additional archive object using the degree of overlap determined to exist between the archive object and the additional archive object by prioritizing deduplication between the archive object and the additional archive object over deduplication between members of a different set of archive objects.

2. The method of claim 1, wherein the e-discovery service processes archive objects for legal investigations.

3. The method of claim 1, wherein adjusting deduplication comprises adjusting a deduplication post-processing stage that follows a deduplication in-line processing stage.

4. The method of claim 3, wherein adjusting a deduplication post-processing stage comprises excluding backup images that share a predetermined threshold amount of deduplication references from the post-processing stage.

5. The method of claim 4, wherein the excluded backup images belong to a set of images comprising archive objects containing an additional predetermined threshold amount of tags.

6. The method of claim 1, wherein determining the degree of overlap comprises determining the degree of overlap based on tags indicating content within the archive object and the additional archive object.

7. The method of claim 6, wherein determining the degree of overlap comprises determining the degree of overlap based on tags indicating text content within the archive object and the additional archive object.

8. The method of claim 1, wherein determining the degree of overlap comprises determining the degree of overlap based on tags indicating metadata for the archive object and the additional archive object.

9. The method of claim 1, wherein adjusting deduplication comprises comparing the degree of overlap determined to exist between the archive object and the additional archive object with an additional degree of overlap determined to exist between the members of the different set of archive objects.

10. The method of claim 9, further comprising determining that the degree of overlap is greater than the additional degree of overlap.

11. The method of claim 10, wherein adjusting deduplication comprises prioritizing deduplication of the archive object and the additional archive object over deduplication of members of the different set of archive objects based on the determination that the degree of overlap is greater than the additional degree of overlap.

12. The method of claim 10, wherein adjusting deduplication comprises prioritizing transmission of at least one of the archive object and the additional archive object based on the determination that the degree of overlap is greater than the additional degree of overlap.

13. The method of claim 10, wherein adjusting deduplication comprises grouping archive objects at different locations to increase predicted deduplication at one of the different locations.

14. A system for deduplicating archive objects, the system comprising:
   a tagging module, stored in memory, that tags, using an e-discovery service, archive objects to indicate data related to the archive objects;
   an assignment module, stored in memory, that assigns an archive object and an additional archive object to be processed by a deduplication engine;
   a determination module, stored in memory, that determines a degree of overlap between the archive object and the additional archive object by determining a number of e-discovery tags that the archive object and the additional archive object share in common;
   an adjustment module, stored in memory, that adjusts, using the deduplication engine, deduplication between the archive object and the additional archive object using the degree of overlap determined to exist between the archive object and the additional archive object by prioritizing deduplication between the archive object and the additional archive object over deduplication between members of a different set of archive objects;
   at least one physical processor that executes the tagging module, the assignment module, the determination module, and the adjustment module.

15. The system of claim 14, wherein the e-discovery service processes archive objects for legal investigations.

16. The system of claim 14, wherein the adjustment module adjusts deduplication at least in part by adjusting a deduplication post-processing stage that follows a deduplication in-line processing stage.

17. The system of claim 16, wherein the adjustment module adjusts the deduplication post-processing stage at least in part by excluding backup images that share a predetermined threshold amount of deduplication references from the post-processing stage.

18. The system of claim 17, wherein the excluded backup images belong to a set of images comprising archive objects containing an additional predetermined threshold amount of tags.

19. The system of claim 14, wherein the determination module determines the degree of overlap at least in part by determining the degree of overlap based on tags indicating content within the archive object and the additional archive object.

20. A non-transitory computer-readable medium comprising one or more computer-executable instructions that, when executed by at least one processor of a computing device, cause the computing device to:
   tag, using an e-discovery service, archive objects to indicate data related to the archive objects;
   assign an archive object and an additional archive object to be processed by a deduplication engine;
   determine a degree of overlap between the archive object and the additional archive object by determining a number of e-discovery tags that the archive object and the additional archive object share in common;

adjust, using the deduplication engine, deduplication between the archive object and the additional archive object using the degree of overlap determined to exist between the archive object and the additional archive object by prioritizing deduplication between the archive object and the additional archive object over deduplication between members of a different set of archive objects.

* * * * *